US009471987B2

(12) United States Patent
Harder et al.

(10) Patent No.: US 9,471,987 B2
(45) Date of Patent: Oct. 18, 2016

(54) AUTOMATIC PLANNING FOR MEDICAL IMAGING

(71) Applicant: Siemens Aktiengesellschaft, München (DE)

(72) Inventors: Martin Harder, Nürnberg (DE); Yiqiang Zhan, West Chester, PA (US); Heiko Meyer, Uttenreuth (DE); Shu Liao, Chester Springs, PA (US)

(73) Assignee: Siemens Healthcare GmbH, Erlangen (DE)

( * ) Notice: Subject to any disclaimer, the term of this patent is extended or adjusted under 35 U.S.C. 154(b) by 197 days.

(21) Appl. No.: 14/337,262

(22) Filed: Jul. 22, 2014

(65) Prior Publication Data

US 2015/0043774 A1 Feb. 12, 2015

Related U.S. Application Data

(60) Provisional application No. 61/863,934, filed on Aug. 9, 2013.

(51) Int. Cl.
G06T 7/00 (2006.01)
G06K 9/32 (2006.01)
G06K 9/20 (2006.01)
H04N 5/321 (2006.01)

(52) U.S. Cl.
CPC ............ *G06T 7/0046* (2013.01); *G06K 9/2027* (2013.01); *G06K 9/3233* (2013.01); *G06K 2209/05* (2013.01); *G06T 2207/20081* (2013.01); *G06T 2207/30008* (2013.01); *G06T 2207/30048* (2013.01); *G06T 2207/30172* (2013.01); *H04N 5/321* (2013.01)

(58) Field of Classification Search
CPC ........ G06K 9/20; G06K 9/2054; G06K 9/32; G06K 9/3216; G06K 9/3233; G06K 9/3241; G06K 2209/05; G06K 2209/051; G06K 2209/055; G06T 7/0012; G06T 7/0014; G06T 7/0042; G06T 7/0046; G06T 2207/30004; G06T 2207/30008; G06T 2207/30101; G06T 2207/30172; A61B 6/488; A61B 6/5294; A61B 8/5292
See application file for complete search history.

(56) References Cited

U.S. PATENT DOCUMENTS

| 6,106,466 A * | 8/2000 | Sheehan et al. ............... 600/443 |
| 2002/0198447 A1 * | 12/2002 | Van Muiswinkel et al. . 600/410 |
| 2006/0269114 A1 * | 11/2006 | Metz ............................ 382/131 |
| 2010/0183206 A1 * | 7/2010 | Carlsen et al. ............... 382/128 |

* cited by examiner

*Primary Examiner* — Andrew W Johns

(57) ABSTRACT

Disclosed herein is a framework for facilitating automatic planning for medical imaging. In accordance with one aspect, the framework receives first image data of a subject. One or more imaging parameters may then be derived using a geometric model and at least one reference anatomical primitive detected in the first image data. The geometric model defines a geometric relationship between the detected reference anatomical primitive and the one or more imaging parameters. The one or more imaging parameters may be presented, via a user interface, for use in acquisition, reconstruction or processing of second image data of the subject.

19 Claims, 7 Drawing Sheets

AUTOMATIC PLANNING FOR MEDICAL IMAGING

CROSS-REFERENCE TO RELATED APPLICATION

This application claims the benefit of U.S. provisional application No. 61/863,934 filed on Aug. 9, 2013, the entire contents of which are incorporated herein by reference.

TECHNICAL FIELD

The present disclosure generally relates to diagnostic imaging and, more specifically, to automated or semi-automated systems and methods for facilitating automatic planning for medical imaging.

BACKGROUND

The field of medical imaging has seen significant advances since the time X-Rays were first used to determine anatomical abnormalities. Medical imaging hardware has progressed from modern machines such as Medical Resonance (MR) imaging scanners, Computed Tomographic (CT) scanners and Positron Emission Tomographic (PET) scanners, to multimodality imaging systems such as PET-CT and PET-MRI systems. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a CAT scanner, MRI, etc. Digital medical images are typically either a two-dimensional ("2D") image made of pixel elements, a three-dimensional ("3D") image made of volume elements ("voxels") or a four-dimensional ("4D") image made of dynamic elements ("doxels"). Such 2D, 3D or 4D images are processed using medical image recognition techniques to determine the presence of anatomical abnormalities such as cysts, tumors, polyps, etc. Given the amount of image data generated by any given image scan, it is preferable that an automatic technique should point out anatomical features in the selected regions of an image to a doctor for further diagnosis of any disease or condition.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor in order to reach an early diagnosis. Hence, there is a need for improving recognition techniques that provide accurate and fast recognition of anatomical structures and possible abnormalities in medical images.

Automatic image processing and recognition of structures within a medical image is generally referred to as Computer-Aided Detection (CAD). A CAD system can process medical images and identify anatomical structures including possible abnormalities for further review. Such possible abnormalities are often called candidates and are considered to be generated by the CAD system based upon the medical images.

Head and neck vessel imaging using MR provides valuable information for the diagnosis of stenosis, dissection, aneurysms and vascular tumors. In order to achieve suitable imaging qualities in contrast enhanced or non-contrast enhanced magnetic resonance angiography (MRA), high-resolution MR slices should be positioned at a specific location and orientation with respect to specific arterial or venous vessels. For example, both carotid arteries, including aortic arch and circle of Willis, should be covered by high-resolution coronal slices. Further, additional scout slices may be acquired to facilitate positioning of so-called Combined Applications to Reduce Exposure (CARE) bolus or test-bolus slices. The last two help to reliably meet the optimal time point of the contrast-agent bolus arrival in the region of interest (ROI).

Proper slice positioning is time consuming, and the number of slices is directly related to the acquisition time and temporal or spatial resolution of dynamic angiographies. Additionally, the slice orientation can also influence the presence of artifacts in the resulting images (e.g., wrap-around if field-of-view is too small). Multiple repetitions to obtain proper positioning and imaging results need to be avoided, particularly in time-critical or emergency examinations (e.g., in stroke MR examinations) and due to the fact that contrast agent administration cannot be repeated during the same MR examination. Thus, slice positioning needs to cover the relevant anatomical structures with the least number of slices and to achieve optimal imaging results. However, in current workflows, slice positioning is often a bottleneck in increasing the speed of workflow and reliability across operators.

SUMMARY

The present disclosure relates to a framework for facilitating automatic planning for medical imaging. In accordance with one aspect, the framework receives first image data of a subject. One or more imaging parameters may then be derived using a geometric model and at least one reference anatomical primitive detected in the first image data. The geometric model defines a geometric relationship between the detected reference anatomical primitive and the one or more imaging parameters. The one or more imaging parameters may be presented, via a user interface, for use in acquisition, reconstruction or processing of second image data of the subject.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

Figure 1:
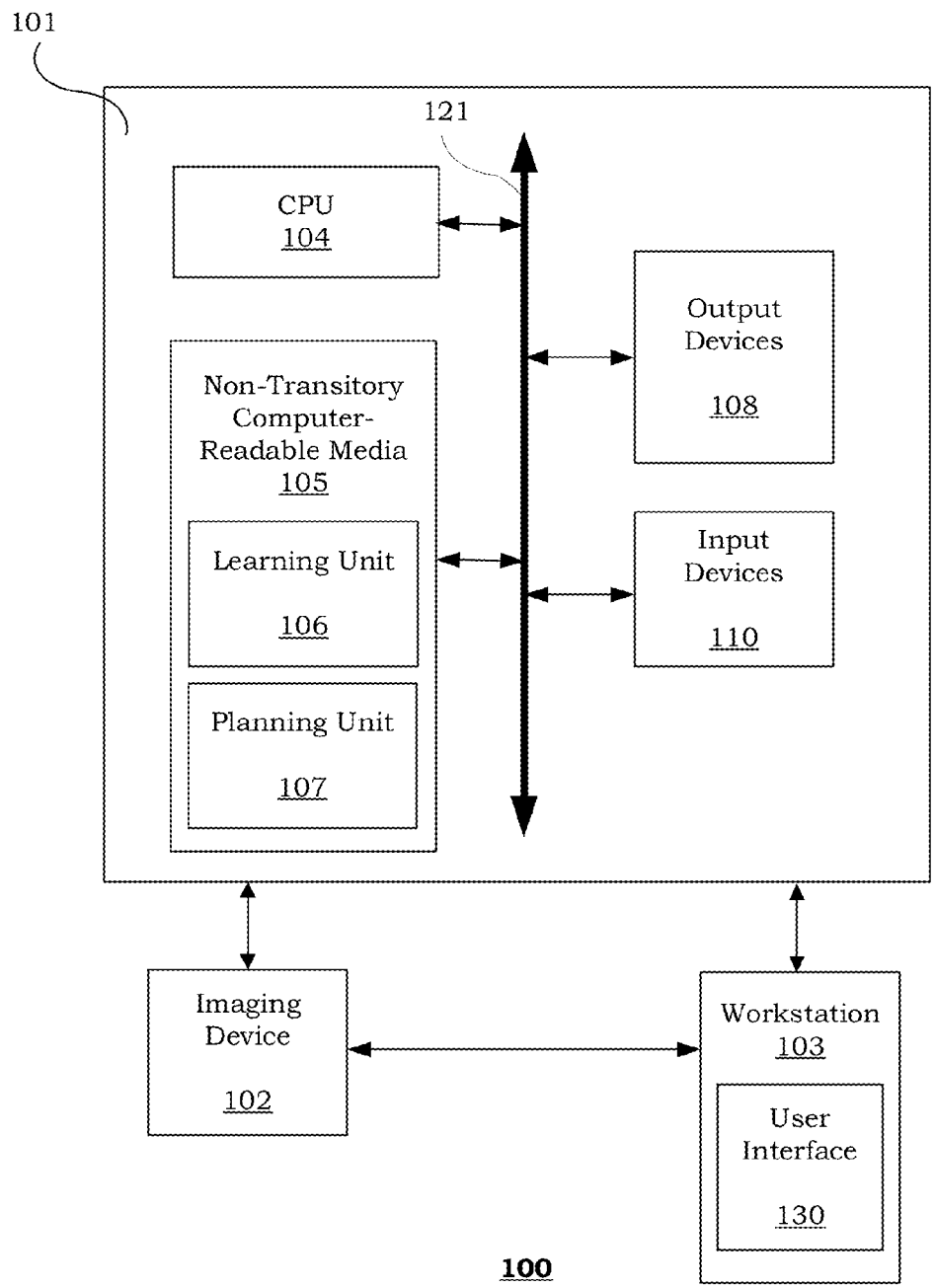
FIG. 1 is a block diagram illustrating an exemplary imaging system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, MRI imaging data may be used herein as an exemplary imaging modality. It will be appreciated, however, that data from any type of imaging modality including, but not limited to, X-Ray radiographs, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system's memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2D images, voxels for 3D images, doxels for 4D images, etc.). The image may be, for example, a medical image of a subject collected by computed tomography, magnetic resonance imaging, ultrasound, or any other medical imaging system known to one of skill in the art. The image may also be provided from non-medical contexts, such as, for example, remote sensing systems, electron microscopy, etc. The methods of the inventions can be applied to images of any dimension, e.g., a 2D picture, 3D or 4D volume. For a 2- or 3-dimensional image, the domain of the image is typically a 2- or 3-dimensional rectangular array, wherein each pixel or voxel can be addressed with reference to a set of two or three mutually orthogonal axes. The terms "digital" and "digitized" as used herein will refer to images or volumes, as appropriate, in a digital or digitized format acquired via a digital acquisition system or via conversion from an analog image.

A framework for automatic planning of medical imaging is described herein. In accordance with one aspect, the framework automatically detects reference anatomical primitives in scout image data of a subject (e.g., patient) using hierarchical detectors. Detected reference anatomical primitives (e.g., structures, surfaces, lines, curves, landmarks, etc.) may be used to automatically derive and prescribe one or more imaging parameters for subsequent medical image acquisition, reconstruction or processing. Exemplary imaging parameters include positions and orientations of individual test bolus slices, CARE bolus slices, further scout slices or high-resolution angiography slices, timing of image acquisition based on estimated blood flow between two automatically-detected anatomical volumes of interest, and so forth. In addition, multi-planar reconstruction (MPR) scout images may also be derived from the detected reference anatomical primitives.

The automatic or semi-automatic planning of imaging parameters provided by the present framework is useful in, for example, head-neck vessel imaging workflows (e.g., MR stroke workflows). It should be appreciated that this framework can also be extended to other workflows related to localization and identification of blood vessels (e.g., coronary plaque detection), other angiography or dynamic workflows. The data-driven detection results provided by the present framework are advantageously adaptive to the particular anatomy of the subject or patient. Further, the framework is advantageously faster, more precise, robust, user-friendly, more reproducible and standardized than previous work. These exemplary advantages and features will be described in further details in the following description.

FIG. 1 is a block diagram illustrating an exemplary imaging system 100. The imaging system 100 includes a computer system 101 for implementing the framework as described herein. The computer system 101 may further be connected to an imaging device 102 and a workstation 103, over a wired or wireless network. The imaging device 102 may be a radiology scanner such as a magnetic resonance (MR) scanner, PET/MR, X-ray or a CT scanner.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more non-transitory computer-readable media 105 (e.g., computer storage or memory), output devices 108 (e.g., monitor, display, printer, etc.) and various input devices 110 (e.g., mouse, keyboard, touch pad, voice recognition module, etc.) via an input-output interface 121. Computer system 101 may further include support circuits such as a cache, a power supply, clock circuits and a communications bus. Even further, computer system 101 may be provided with a graphics controller chip, such as a graphics processing unit (GPU) that supports high performance graphics functions.

It is to be understood that the present technology may be implemented in various forms of hardware, software, firmware, special purpose processors, or a combination thereof. In one implementation, the techniques described herein are implemented by learning unit 106 and planning unit 107. Learning unit 106 and planning unit 107 may include computer-readable program code tangibly embodied in non-transitory computer-readable media 105. Non-transitory computer-readable media 105 may include random access memory (RAM), read only memory (ROM), magnetic floppy disk, flash memory, and other types of memories, or a combination thereof. The computer-readable program code is executed by CPU 104 to control and/or process image data from imaging device 102.

As such, the computer system 101 is a general-purpose computer system that becomes a specific-purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein. Computer system 101 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 101.

The workstation 103 may include a computer and appropriate peripherals, such as a keyboard and display, and can be operated in conjunction with the entire system 100. For example, the workstation 103 may communicate with the imaging device 102 so that the image data acquired by, for instance, imaging device 102 can be rendered at the workstation 103 and viewed on the display. The workstation 103 may include a user interface 130 that allows a radiologist or any other skilled user (e.g., physician, technician, operator, scientist, etc.) to manipulate and view the image data. Further, the workstation 103 may communicate directly with computer system 101 to present acquired, reconstructed and/or processed image data. For example, a radiologist can interactively manipulate the displayed representation of the processed image data and view it from various viewpoints and in various reading modes.

Figure 2:
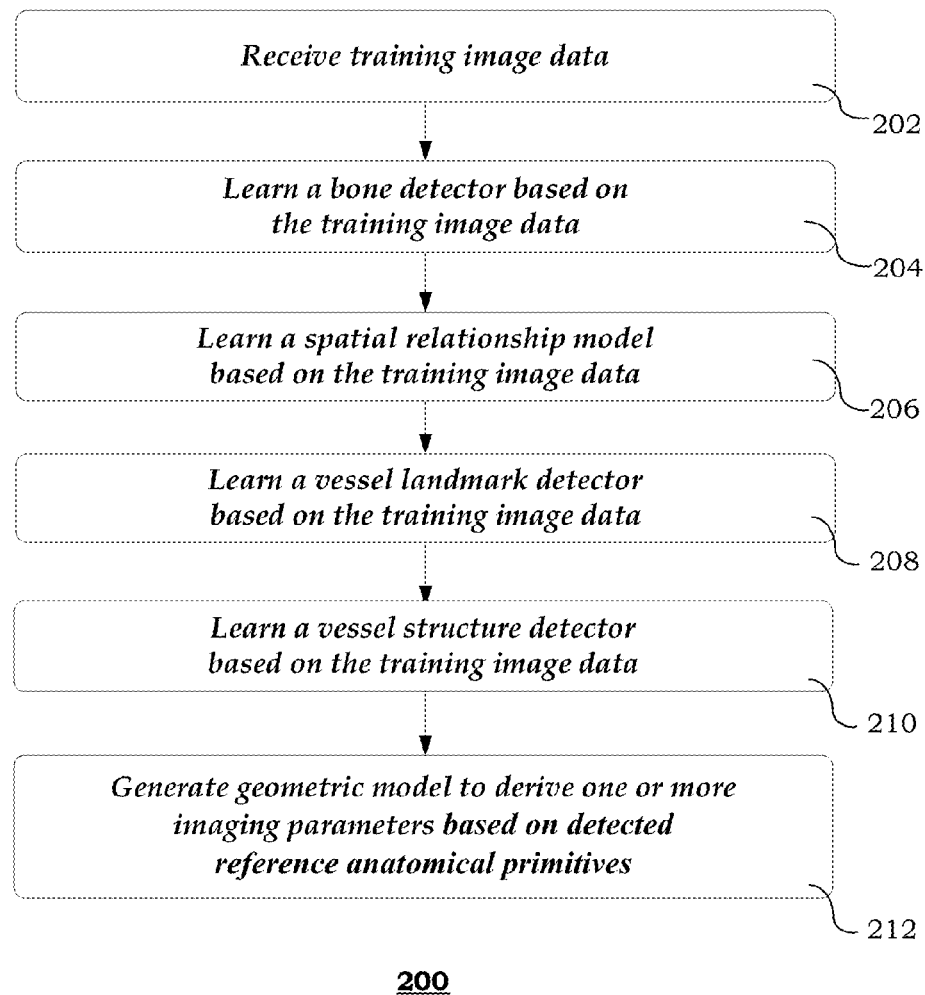
FIG. 2 shows an exemplary method of training hierarchical detectors.

FIG. 2 shows an exemplary method 200 of training hierarchical detectors. In some implementations, the method 200 is performed offline (e.g., pre-operatively, before a surgical intervention or procedure is performed on a subject or patient). It should be noted that the steps of the method 200 may be performed in the order shown or a different order. Furthermore, different, additional or fewer steps may be implemented. Even further, the method 200 may be implemented with the system 100 of FIG. 1, a different system, or a combination thereof.

At 202, learning unit 106 receives training image data. The training image data may be acquired from one subject (e.g., a patient) or multiple subjects. The training image data may be acquired based on non-contrast-enhanced magnetic resonance imaging. Alternatively, the training image data may be acquired based on contrast-enhanced magnetic resonance images and/or non-contrast enhanced angiography (MRA) data of blood vessels (e.g., Time of Flight (TOF) or otherwise labeled flowing spins). Other types of training image data are also useful. Exemplary blood vessels include, but are not limited to, intra- and/or extra-cranial vessels (e.g., carotids, aortic arch, etc.). Other types of imaging modalities or structures of interest are also useful.

In exemplary steps 204, 206, 208 and 210, learning unit 106 learns hierarchical detectors of reference anatomical primitives and their associated anatomical context (e.g., spatial relations). In some implementations, the hierarchical detectors are learned independently. Alternatively, one or more hierarchical detectors may be learned based on other hierarchical detectors. After learning, the hierarchical detectors may be invoked in a hierarchical manner during runtime, as will be discussed with reference to FIG. 3.

Reference anatomical primitives may be used to derive imaging parameters for subsequent image acquisition, reconstruction or processing. Some reference anatomical primitives are visible within the training image data, while other reference anatomical primitives may not be easily distinguishable or visible within the image data and may be located based on other reference anatomical primitives. For example, the location of the aortic arch may be predicted based on the location of the T5 vertebra. Exemplary types of reference anatomical primitives include, but are not limited to, landmarks, lines, curves, surfaces, structures, and so forth. For purposes of illustration, the reference anatomical primitives described in steps 204-210 include bone structures, vessel landmarks and structures. However, it should be appreciated that detectors of other reference anatomical primitives may also be trained.

Turning to step 204 in more detail, learning unit 106 may learn at least one bone detector based on the training image data. Since bone structures are more distinctive and typically quite consistent in relation to vessels or other soft tissue, they provide a coarse but robust estimation of the locations of vessel structures. Exemplary bone structures include, for example, foramen magnum, C5 vertebra, T5 vertebra, etc. Other types of bone structures also possible. The detectors may be learned using appearance models, active shape models, or any other suitable machine learning technique.

At 206, learning unit 106 learns at least one spatial relationship model based on the training image data. The spatial relationship model captures the geometric relationship between at least one reference anatomical primitive (e.g., bone structure) and another reference anatomical primitive (e.g., vessel structure or landmark). The spatial relationship model may include, for example, a linear regression model, active shape model, etc.

At 208, learning unit 106 learns at least one vessel landmark detector based on the training image data. A landmark (or semantic point) may be any easily distinguishable or anatomically meaningful point in the image data. For example, in the context of blood vessels, the most distinctive landmarks may include, but are not limited to, bifurcations of vessels (e.g., basilaris artery bifurcation to vertebral arteries), junction points of vessels, aortic arch center, center circle of Willis, and so forth. The detectors may be learned using appearance models, active shape models, or any other suitable machine learning technique.

At 210, learning unit 106 learns at least one vessel structure detector based on the training image data. Exemplary vessel structures may include, but are not limited to, the common carotid artery, ascending aorta, descending aorta, basilaris artery, middle cerebral artery, typical anatomical normal-variants, patterns and/or pathologies thereof, and so forth. The detectors may be learned using appearance models, active shape models, or any other suitable machine learning technique.

At 212, learning unit 106 generates a geometric model to derive one or more imaging parameters based on reference anatomical primitives detected by the learned hierarchical detectors. The geometric model defines the geometric relationships between detected reference anatomical primitives and one or more imaging parameters (e.g., geometric relationship between detected vessel and MR slice position). Exemplary geometric relationships include, but are not limited to, relative angle relationships, dimensions, symmetries, positions, and so forth. Such geometric model may be configurable or adjustable by the system administrator.

Figure 3:
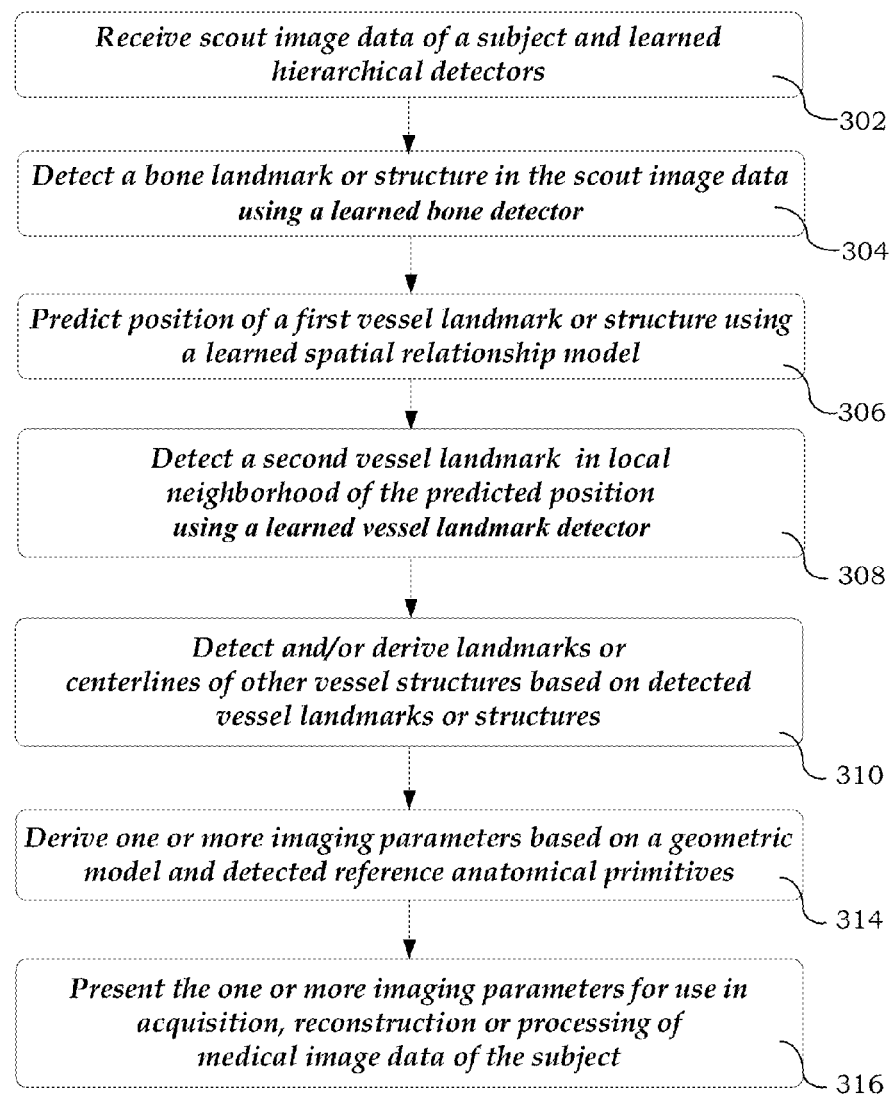
FIG. 3 shows an exemplary method of medical imaging planning.

FIG. 3 shows an exemplary method 300 of medical imaging planning. In some implementations, the method 300 is performed online (e.g., intra-operatively while a surgical intervention or procedure is performed on a subject or patient). It should be noted that the steps of the method 300 may be performed in the order shown or a different order. Furthermore, different, additional or fewer steps may be implemented. Even further, the method 300 may be implemented with the system 100 of FIG. 1, a different system, or a combination thereof.

At 302, planning unit 107 receives scout image data of a subject (e.g., patient) and one or more learned hierarchical detectors. Scout image data is generally low resolution preliminary images acquired prior to performing the major portion of a particular study. The scout image data may be acquired by, for example, imaging device 102. The scout image data of the subject may be acquired at least in part by the same modality (e.g., MR) as the training image data used to learn hierarchical detectors, as previously described with reference to FIG. 2.

The one or more hierarchical detectors may be learned using, for example, method 200 as previously described with reference to FIG. 2. At steps 304, 306, 308 and 310, the planning unit 107 invokes the learned hierarchical detectors to detect various reference anatomical primitives in the scout image data. The hierarchical detectors may be invoked in a hierarchical sequence. The hierarchical sequence may be determined based on, for example, detection reliability, spatial relations between the different reference anatomical primitives, and so forth. For example, more distinctive reference anatomical primitives with the highest detection reliability may be detected first. The locations of such detected reference anatomical primitives may be used to predict the locations of other spatially correlated reference anatomical primitives. For purposes of illustration, the hierarchical detectors described in steps 304, 306, 308 and 310 include a bone structure detector, a spatial relationship model, a vessel landmark detector and a vessel structure detector. However, it should be appreciated that other detectors may also be used, depending on the specific application.

Turning to step 304 in more detail, planning unit 107 detects bone landmarks or structures in the scout image data using a learned bone detector. At 306, planning unit 107 predicts positions of major vessel landmarks in the scout image data by applying a learned spatial relationship model that captures the geometric relation between the detected bone structure and the major vessel landmark. At 308, planning unit 107 detects one or more distinctive vessel landmarks or structures in the local neighborhood of predicted positions in the scout image data using a learned vessel landmark detector. At 310, planning unit 107 detects and/or derives landmarks and/or centerlines of vessel structures in the scout image data based on detected distinctive vessel landmarks and/or vessel structures (e.g., small vessel structures and their normal-variants). The other vessel structures may be detected using a learned vessel structure detector. At 314, planning unit 107 derives one or more imaging parameters based on a geometric model and detected reference anatomical primitives. The one or more imaging parameters may include patient-specific image acquisition volumes and their corresponding orientations, such as a 3D or 4D contrast-enhanced magnetic resonance angiography volume for visualizing contrast enhancement, time-of-flight angiography acquisition volume, and so forth. The volumes may be prescribed based on the detected anatomical primitives and according to typical normal variants, typical pathologies and pre-set imaging parameters (e.g., field of view, phase encoding direction, effective thickness, acquisition time, etc.). Other types of imaging parameters may include, but are not limited to, positioning of a bolus tracking slice or window, reconstruction planes or volumes for reconstructing images from the scout image data, and so forth.

The geometric model defines the geometric relationship between the detected reference anatomical primitives and the one or more imaging parameters. In the context of an automatic bolus tracking slice positioning application, for instance, the one or more imaging parameters may include the locations and orientation of high-resolution slice groups to be acquired, the timing of slice group image acquisition upon bolus arrival, etc. The timing of image acquisition may be determined based on the estimated blood flow in a blood vessel (e.g., carotid artery) between two automatically detected volumes of interest. Other types of imaging parameters may also be determined, depending on the particular application, as will be described in further detail later. The planning unit 107 may further generate performance data associated with such imaging parameters. Performance data may include, for example, sensitivity and specificity of the suggested slice positions.

At 316, planning unit 107 presents the one or more imaging parameters for use in acquisition, reconstruction or processing of medical image data of the subject. The medical image data may include, for example, MR image data of the subject's head or neck. The one or more imaging parameters may be presented via, for instance, a user interface at workstation 103. The user interface may support different types of workflows, such as an MR angiography workflow, a stroke MR imaging workflow, or other dynamic workflows. Textual and/or graphical user guidance may be generated, based on the one or more imaging parameters, to facilitate a workflow for medical image acquisition, reconstruction or processing. The guidance advantageously allows even inexperienced users to perform steps of the imaging workflow. For example, in a test bolus workflow, the user interface may provide guidance on when and where to inject the test bolus or contrast agent, where to position the slice image to be acquired, when and how to trigger the slice image acquisition, and so forth. Further, the user interface may also provide online tracking of the bolus as it travels along the blood vessel (e.g., carotid) and arrives at the target region of interest. Additionally, the user interface may enable the user to configure the parameters of the imaging protocols (e.g., CARE bolus protocol, MR angiography 3D/4D protocol, test bolus protocol, etc.).

Figure 4:
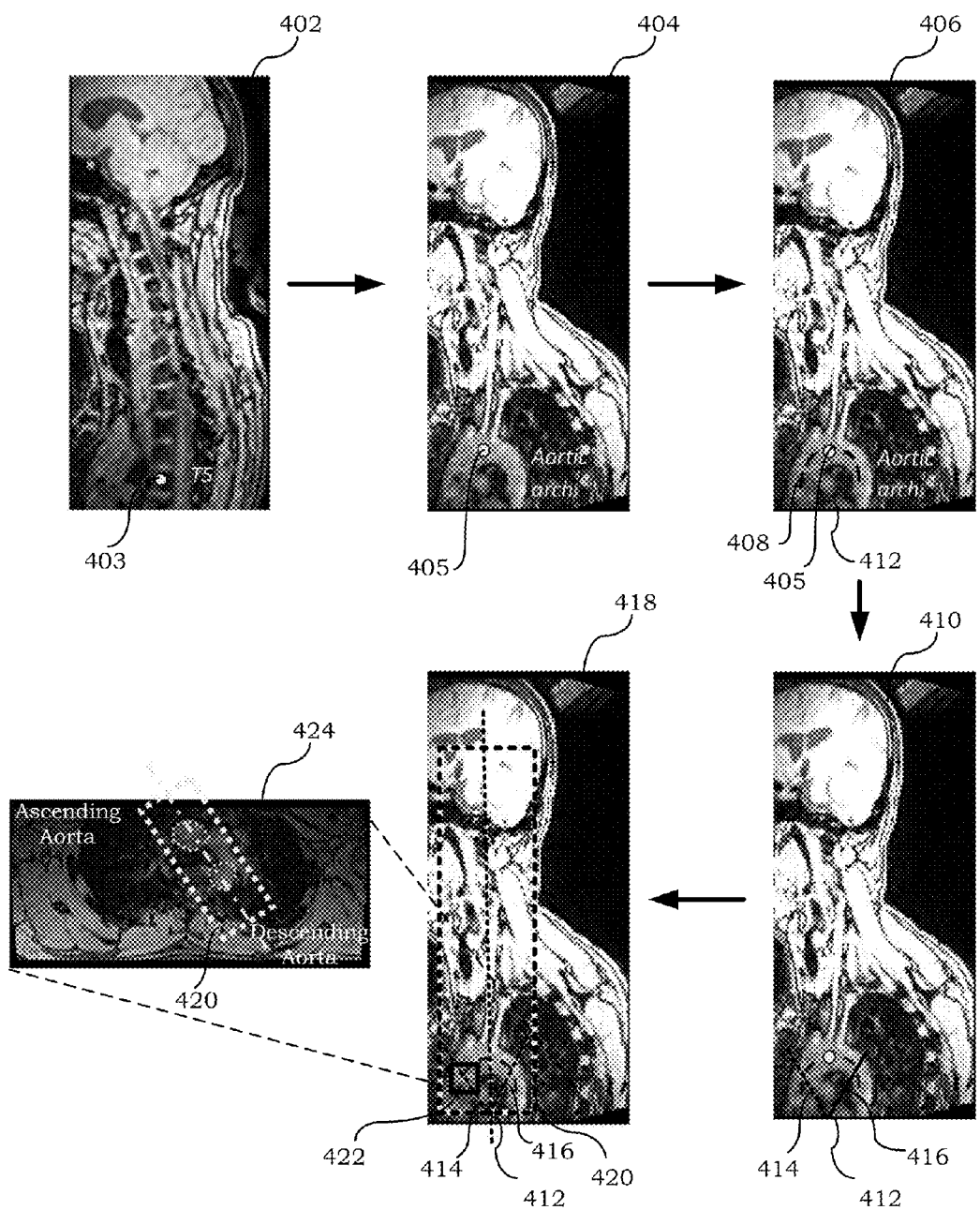
FIG. 4 illustrates an exemplary application for automatic scan positioning of CARE bolus slice group.

FIG. 4 illustrates an exemplary application for automatic scan positioning of CARE bolus slice group. CARE bolus is an exemplary bolus-tracking program that allows the user to trigger the scan as soon as the bolus arrives in the region of interest. MR scout images 402, 404, 406, 410 and 418 show various sagittal views of the subject's head, neck and chest regions at different stages of hierarchical detection. The hierarchical detection is performed to detect the locations of reference anatomical primitives, which are then used to automatically derive the scan positioning of CARE bolus high-resolution slice group for acquisition.

As indicated in scout image 402, planning unit 107 first detects the T5 vertebra 403 using the learned bone detector. The T5 vertebra 403 has a strong spatial correlation with the aortic arch in terms of its feet-to-head (FH) position. As shown in scout image 404, planning unit 107 may predict the position of the aortic arch landmark 405 using a learned spatial relationship model that captures the geometric relationship between the aortic arch landmark 405 and the T5 vertebra 403. In scout image 406, planning unit 107 has detected the centerline of the aorta 412 in the neighborhood 408 of predicted position of the aortic arch landmark 405 using a learned vessel landmark detector. By using the aorta centerline 412, the planning unit 107 is able to derive the secondary structures—ascending aorta 414 and descending aorta 416 (as shown in image 410), which would otherwise be difficult to detect based on image contrast alone.

Scout image 418 shows the CARE bolus slice group scan region (dashed box 420) and bolus tracking window (solid box 422) generated by planning unit 107 based on the geometric model and detected reference anatomical primitives. The geometric model may define the centerline of the bolus slice group 420 along the midline between the ascending and descending aortas 414 and 416. The position of the bolus tracking window 422 may be defined along the ascending aorta 414. Image 424 shows the axial view of the bolus slice group scan region 420.

Figure 5:
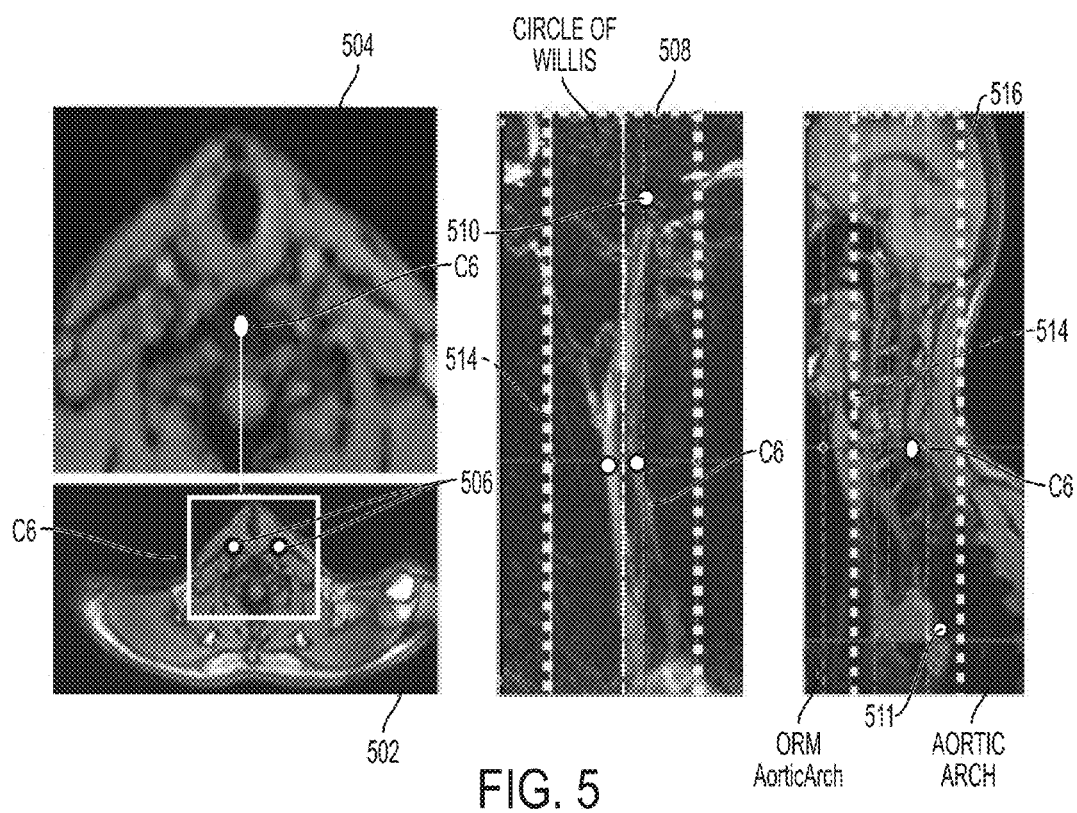
FIG. 5 illustrates an exemplary application for automatic scan positioning of a contrast-enhanced (CE)-MRA volume.

FIG. 5 illustrates an exemplary application for automatic scan positioning of contrast-enhanced (CE)-MRA volume. According to a CE-MRA carotids protocol, the CE-MRA acquisition volume covers the aortic arch and circle of Willis. The CE-MRA acquisition volume may be automatically positioned based on bone structure landmarks and dedicated vessel landmarks. More particularly, planning unit 107 may invoke a learned bone detector to detect the C6 vertebra, as indicated by landmarks 506 in the axial scout image 502. Image 504 shows a magnified view of the C6 vertebra region. Planning unit 107 then predicts, using a learned spatial relationship model, the positions of the major vessel landmark 510 and 511 associated with the circle of Willis and the aortic arch respectively. Planning unit 107 may then derive the CE-MRA acquisition volume 514 based on the detected bone structure and predicted vessel landmark positions, as shown in the sagittal views 508 and 516. More particularly, the CE-MRA acquisition volume 514 may be derived by defining its centerline (and orientation) 512 in a $1^{st}$ approximation using the detected C6 vertebra landmarks 506. The position and range of the CE-MRA acquisition volume may be derived using the predicted locations of the vessel landmarks (510 and 511).

Figure 6:
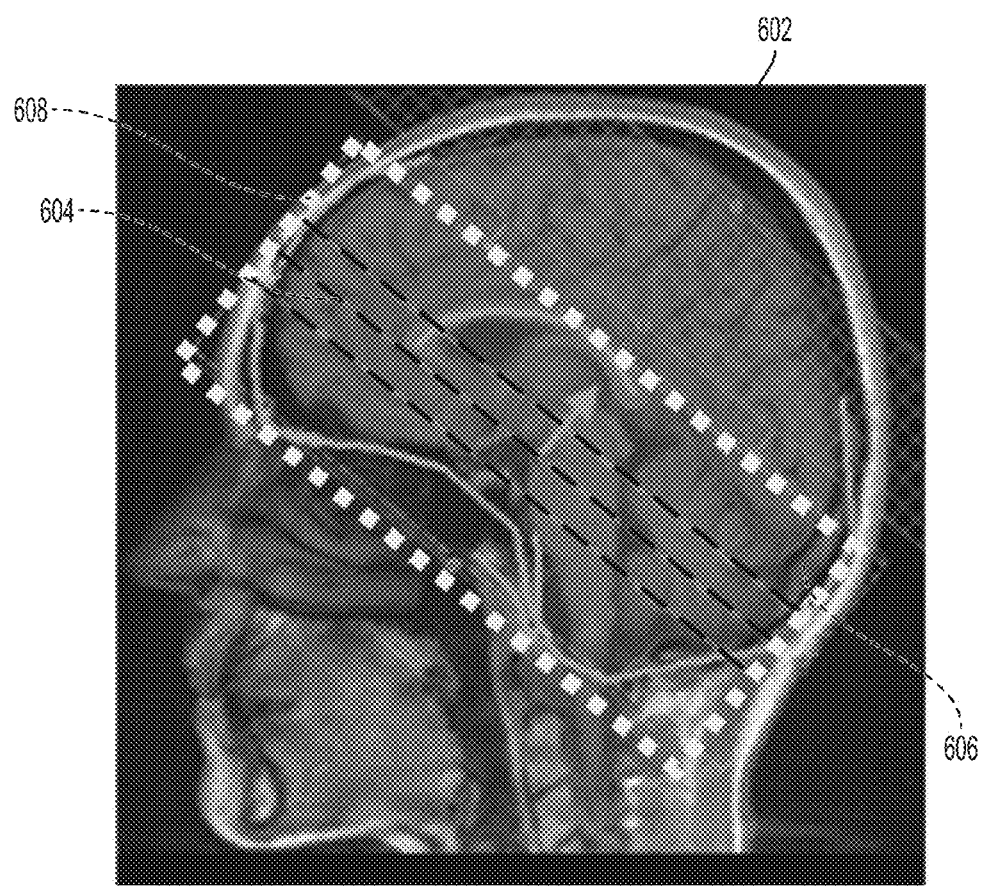
FIG. 6 illustrates an exemplary application for automatic scan positioning of a time-of-flight (TOF) angiography acquisition volume.

FIG. 6 illustrates an exemplary application for automatic scan positioning of a time-of-flight (TOF) angiography acquisition volume. TOF is an MRI technique to visualize flow within blood vessels, without the need to administer exogenous contrast agents. As shown by scout image 602, planning unit 107 may derive the centerline 604 and the orientation of the TOF acquisition volume 608 based on bone landmarks (e.g., occipital bone 606) and vessel landmarks (e.g., anterior cerebral artery, middle cerebral artery, basilaris artery, etc.) detected using hierarchical detectors.

Figure 7:
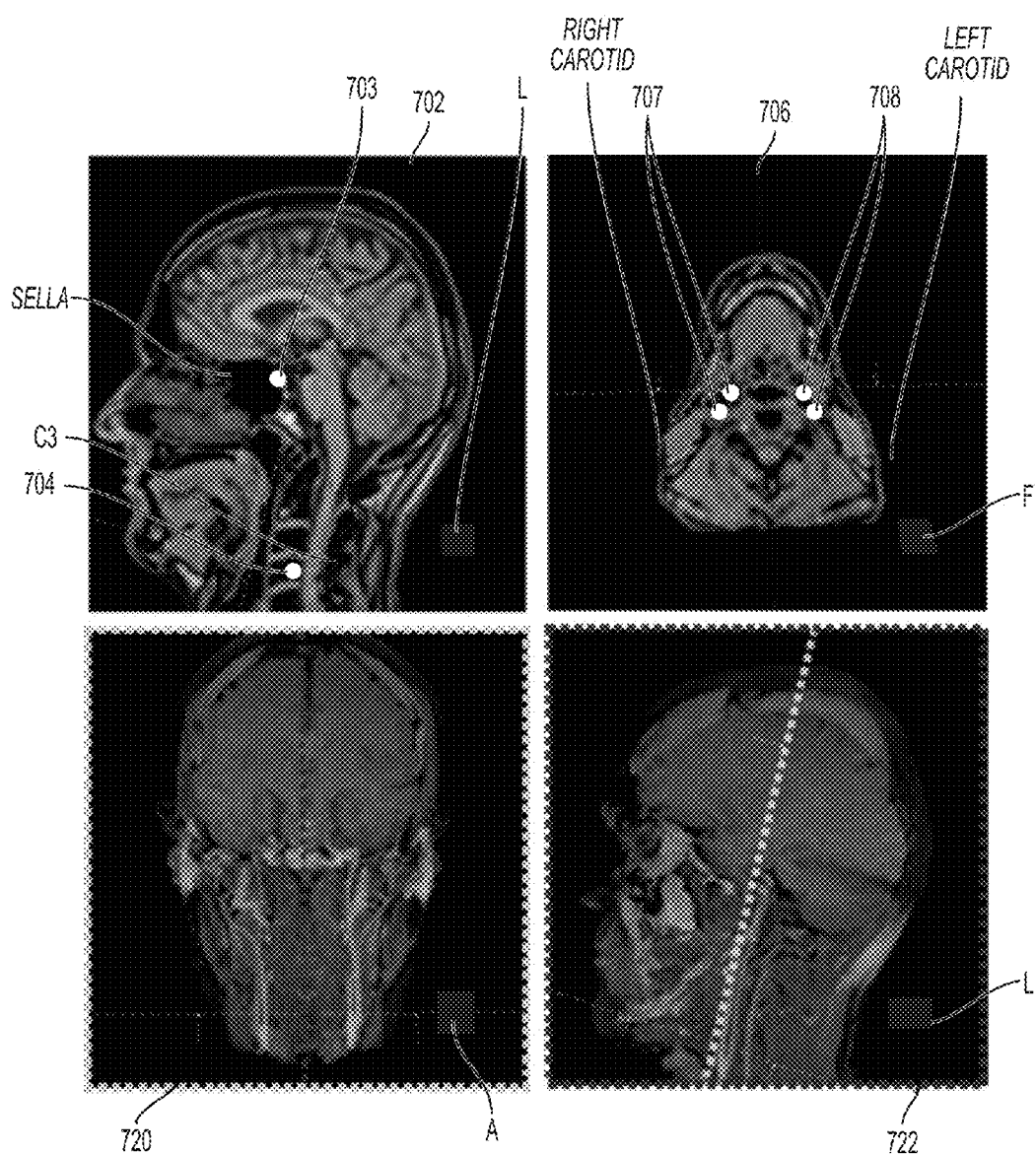
FIG. 7 illustrates an exemplary application for reconstructing 2D vessel scout-Thin Maximum Intensity Projection (MIP) images from a T1-weighted 3D scout image.

FIG. 7 illustrates an exemplary application for reconstructing a 2D vessel scout-Thin Maximum Intensity Projection (MIP) image from a T1-weighted 3D scout image. MIP is a volume rendering method for 3D data that projects in the visualization plane the voxels with maximum intensity that fall in the way of parallel rays traced from the viewpoint to the reconstruction plane. Planning unit 107 may first automatically detect the bone structure landmarks 704 and 703 associated with the C3 vertebra and Sella (as shown in lateral scout image 702), followed by right and left carotid landmarks 707 and 708 in the vicinity of the bone structure landmarks 703 and 704 (as shown in axial scout image 706). The orientation, centerline and/or range of the ThinMIP reconstruction planes (e.g., 50 mm thickness) may then be derived based on the detected right and left carotid landmarks 707 and 708. The anterior-posterior (AP) and lateral 2D projection images 720 and 722 may then be reconstructed from a 3D scout image (702 and 706) using the derived reconstruction planes.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The invention claimed is:

1. A non-transitory computer-readable medium embodying a program of instructions executable by machine to perform steps for medical imaging planning, the steps comprising:
   (i) learning hierarchical detectors based on training image data;
   (ii) detecting reference anatomical primitives in first image data of a subject by applying the learned hierarchical detectors;
   (iii) deriving one or more imaging parameters based on a geometric model, wherein the geometric model defines a geometric relationship between at least one of the detected reference anatomical primitives and the one or more imaging parameters; and
   (iv) presenting, via a user interface, the one or more imaging parameters for use in acquisition, reconstruction or processing of second image data of the subject.

2. The non-transitory computer-readable medium of claim 1, wherein the program of instructions is further executable by the machine to learn the hierarchical detectors by
   learning a bone detector, and
   learning a spatial relationship model that captures a geometric relationship between a bone structure and a vessel structure or landmark.

3. A computer-implemented method of medical imaging planning, comprising:

(i) receiving first image data of a subject;

(ii) detecting at least one reference anatomical primitive by invoking learned hierarchical detectors to detect at least one distinctive landmark, curve, surface, structure or a combination thereof (iii) automatically deriving, by a processor, one or more imaging parameters by using a geometric model and the at least one reference anatomical primitive detected in the first image data, wherein the geometric model defines a geometric relationship between the detected reference anatomical primitive and the one or more imaging parameters; and (iv) presenting, via a user interface, the one or more imaging parameters for use in acquisition, reconstruction or processing of second image data of the subject.

4. The method of claim 3 wherein detecting the reference anatomical primitive comprises invoking the hierarchical detectors in a hierarchical sequence based on detection reliability, spatial relations between different reference anatomical primitives, or a combination thereof.

5. The method of claim 3 wherein detecting the reference anatomical primitive in the first image data comprises detecting at least one bone structure in the first image data by invoking a learned bone detector.

6. The method of claim 5 wherein detecting the reference anatomical primitive in the first image data further comprises detecting a first vessel landmark or structure in the first image data by applying a spatial relationship model that captures a geometric relationship between the detected bone structure and the first vessel landmark or structure.

7. The method of claim 6 wherein detecting the reference anatomical primitive in the first image data further comprises detecting a second vessel landmark or structure within a local neighborhood of the first vessel landmark or structure by applying a learned vessel landmark detector.

8. The method of claim 7 wherein detecting the reference anatomical primitive in the first image data further comprises deriving a landmark or a centerline of a vessel structure based at least in part on the detected second vessel landmark or structure.

9. The method of claim 3 wherein automatically deriving the one or more imaging parameters comprises deriving an image acquisition volume and its corresponding orientation.

10. The method of claim 3 wherein automatically deriving the one or more imaging parameters comprises determining scan positioning of a bolus tracking slice.

11. The method of claim 10 wherein the bolus tracking slice covers an ascending aorta and a descending aorta.

12. The method of claim 3 wherein automatically deriving the one or more imaging parameters comprises determining scan positioning of a contrast-enhanced magnetic resonance angiography volume.

13. The method of claim 12 wherein the contrast-enhanced magnetic resonance angiography volume comprises a three-dimensional magnetic resonance angiography volume for visualizing contrast enhancement.

14. The method of claim 12 wherein the contrast-enhanced magnetic resonance angiography volume comprises a four-dimensional magnetic resonance angiography volume for visualizing contrast enhancement.

15. The method of claim 12 wherein the contrast-enhanced magnetic resonance angiography volume covers an aortic arch and a circle of Willis.

16. The method of claim 3 wherein automatically deriving the one or more imaging parameters comprises determining scan positioning of a non-contrast-enhanced acquisition volume.

17. The method of claim 3 wherein automatically deriving the one or more imaging parameters comprises determining one or more reconstruction planes or volumes for reconstructing one or more images or volumes from the first image data.

18. The method of claim 3 wherein presenting, via the user interface, the one or more imaging parameters comprises facilitating a workflow for the acquisition, reconstruction or processing of the second image data of the subject by presenting guidance generated based on the one or more imaging parameters.

19. A medical imaging planning system, comprising:
a non-transitory memory device for storing computer-readable program code; and
a processor in communication with the memory device, the processor being operative with the computer-readable program code to perform steps comprising
(i) receiving scout image data of a subject and learned hierarchical detectors;
(ii) detecting reference anatomical primitives in the scout image data by invoking the learned hierarchical detectors;
(iii) deriving one or more imaging parameters based on a geometric model, wherein the geometric model defines a geometric relationship between at least one of the detected reference anatomical primitives and the one or more imaging parameters; and
(iv) presenting, via a user interface, the one or more imaging parameters for use in acquisition, reconstruction or processing of medical image data of the subject.

* * * * *